United States Patent [19]
Sheehan et al.

[11] 3,735,673
[45] May 29, 1973

[54] BAG MANUFACTURING MACHINE

[76] Inventors: Richard S. Sheehan, 1672 S. Elizabeth, Denver, Colo. 80210; Twyman Guard, 795 S. Alton Way, Denver, Colo. 80231

[22] Filed: Apr. 4, 1972

[21] Appl. No.: 241,037

[52] U.S. Cl. ............... 93/35 R, 83/319, 93/DIG. 1, 93/8 R, 264/209
[51] Int. Cl. ..................... B31b 1/64, B31b 49/04
[58] Field of Search ................ 93/35 R, 33 H, 1 G, 93/DIG. 1, 8 R; 264/156, 209; 156/515; 83/318, 319, 320

[56] References Cited
UNITED STATES PATENTS

| | | | |
|---|---|---|---|
| 3,456,540 | 7/1969 | Manini | 83/320 X |
| 3,574,039 | 4/1971 | Fehr et al. | 93/33 H |
| 2,524,584 | 10/1950 | Zehr | 93/DIG. 1 |
| 2,834,395 | 5/1958 | Russell et al. | 93/DIG. 1 |
| 2,978,008 | 4/1961 | Conti | 93/DIG. 1 |
| 3,656,385 | 4/1972 | Kimbrell | 83/320 X |
| 3,267,786 | 8/1966 | Kuts et al. | 83/318 |

*Primary Examiner*—Andrew R. Juhasz
*Assistant Examiner*—James F. Coan
*Attorney*—William H. Dean

[57] ABSTRACT

A plastic bag producing machine and method adapted for continuous production of plastic bags from extruded tubing such as conventional polyethylene plastic or the like; said machine being adapted for high rate operation in line with an extruder and for receiving plastic tubing in flat condition directly downstream from the extruder and for heat sealing and perforating the plastic tubing at evenly spaced positions therealong, during which time the plastic tubing is constantly moving; said machine having a movable carriage adapted to move backward toward the extruder and to move forward at a rate of movement of the plastic tubing from the extruder, and to heat seal, as well as cool the heat sealed area, while the plastic tubing is clamped between a pair of clamp means to avoid tension separation of the heat sealed portion thereof; said machine also having separator means adapted automatically to separate each perforated portion of flat tubing for delivering separate bags in timed relation to the heat sealing and perforating functions, or the machine of the invention may be selectively operated to roll the heat sealed and perforated tubing into a roll, if desired.

14 Claims, 17 Drawing Figures

BAG MANUFACTURING MACHINE

BACKGROUND OF THE INVENTION

Plastic extruding machines have been utilized for extruding tubular polyethylene plastic material, and the tubular material is generally delivered by the extruder at a fairly high linear rate. The tubular material may be passed between rollers or other suitable structures for flattening the tubular structure so that opposite walls thereof are adjacent to each other, and this tubular material may either be rolled or formed into individual plastic bags, or into continuous strips of heat sealed and perforated bags so that such bags may be maintained in rolls, if desired, for tearing the bags loose at the perforations to provide for convenience in separating the bags one from the other. Additionally, such bags may be heat sealed and perforated, and separated and stacked as separate bags, if desired.

In accordance with prior art practice, machines have been used to provide a lateral heat seal across the flattened tubular plastic, and to provide a perforated area adjacent the heat sealed area so as to permit separation of one bag from another in an entire elongated section of flat tubular plastic.

In accordance with prior art practice, the high linear rate of an extruder is such that many bag manufacturing machines have been unable to heat seal and perforate the flat tubular plastic at spaced intervals and at rates sufficiently high to match the linear extrusion rate of the extruder. Furthermore, many machines have been unable to operate at a substantial heat sealing and perforating rate without causing separation or thinning at the heat sealed areas. There have been various attempts at heating and cooling heat seal bars to increase the rate of heat sealing production of tubular plastic materials; however, the problem of matching the extrusion rate or approaching the extrusion rate of tubular plastic during the heat sealing and perforating thereof to form bags, has been of considerable interest. Additionally, the high rate heat sealing and perforation of flat tubular plastic material has heretofore been somewhat compromised due to thinning or partial separation of the bags at the heat sealed areas, which may cause various difficulties in handling or accurate winding into rolls of bags. Furthermore, the heat sealed ends of such bags, when improperly produced, may be thin and weak and consequently may tear open and drop the contents therefrom.

SUMMARY OF THE INVENTION

The present invention relates to a plastic bag producing machine and method which efficiently heat seals and perforates tubular plastic such as polyethylene or the like at a very high rate in line with an extruder wherein the machine and method of the invention operates directly upon the plastic tubing as it is delivered from the extruder at a very high linear rate.

The invention comprises a frame on which a carriage is reciprocally movable backward toward the extruder and forward in the opposite direction. The carriage supports and operates a heat seal bar and a perforator bar together with a pair of straddling clamp means which straddle the heat seal bar and tend to hold the plastic while the heat seal thereof is cooling after being heat sealed by the heat seal bar, so as to prevent tension separation of the plastic which is being pulled through the machine of the invention from the extruder and rolled into a roll or separated into separate bags, as desired.

The carriage, together with the foregoing heat seal bar, perforator bar and pair of clamp means, moves in a direction forwardly away from the extruder at the same rate as the plastic material is moving therefrom, and the heat seal bar is operated and released from the plastic and the plastic is allowed to cool during the time when the carriage is moving and when clamp means at opposite sides of the heat seal bar prevent tension separation of the plastic at the heat seal area.

The aforementioned carriage supports a platen which is movable relative to a heat seal bar, a perforator bar, and a pair of spring loaded clamp means which straddle the heat seal bar, and cam means on one of the clamp means causes the clamp means to move toward the heat seal bar in engagement with the tubular plastic on the platen to create a slack condition between the clamp means and at the heat seal bar area so as to relieve tension and allow cooling of the plastic before the clamp means are released.

A pair of elevators are utilized, one which raises the platen and the plastic thereon into engagement with the heat seal bar, perforator bar and the pair of clamp means which straddle the heat seal bar, and the other elevator is utilized at a lower position so as to permit the platen to be lowered when the first elevator is de-energized, the second elevator being at a position wherein the tubular plastic is still engaged by the pair of clamp means under spring loaded condition and wherein the heat seal bar is disengaged from the tubular plastic to allow cooling thereof before the clamp means is released and during which time the carriage is moving at a comparable linear rate with the movement of the plastic from the extruder to rolls or bag separator means, as desired.

The carriage is operable by a reversible drive means which comprises a pair of electrical clutches which selectively operate either a direct drive means or a speed increasing gear train which operates an endless chain coupled to the carriage so that the electrical clutches may be alternately operated by switches at opposite ends of the carriage travel to automatically reverse movement of the carriage such that the carriage may be moved forwardly of the direct drive means and may be moved backwardly toward the extruder at a higher rate of speed by the speed increasing gear train of the reversible drive means.

Switches engageable by the carriage of the invention as it travels longitudinally along the frame successively cause engagement of the heat seal bar, clamp means and perforator bar, with plastic material on the platen carried by the carriage and release of the heat seal bar from the plastic, then subsequent release of the clamp means from the plastic tubing and then reversal of the carriage to a beginning position for another cycle of operation.

A bag separator mechanism of the invention operates between two pairs of peripherally compressible drive rollers and the bag separator comprises a separator bar having fingers which rotate by means of a single revolution clutch through and between horizontal fingers extending in peripheral grooves of the drive rollers and the single revolution clutch mechanism rotates the separator bar one revolution between said guide bars in timed relation with the heat seal and perforator bars of the invention and this single revolution clutch is initially energized by movement of the carriage of the invention to a preselected position on the frame of the invention to coincide with a heat sealed and perforated portion of the plastic tubing as it emerges between the two sets of drive rollers and in proximity to the ends of the fingers of the separator bar as it is rotated a single revolution between the guide bars which abridge between the two sets of drive rollers. Thus, the heat sealed and perforated plastic tubing may be separated into separate bags or the switch which energizes the single revolution clutch may be locked out of position so that the single revolution clutch does not operate and the continuous flat plastic tubing may be heat sealed and perforated and moved continuously through said pairs of drive rollers and onto a winding roller which winds the heat sealed and perforated bags continuously onto a storage or wind roller. The storage roller usually carries a cardboard spool which may subsequently be placed on a mandrel in a grocery store or the like so that customers may tear each successive bag at the perforations provided by the perforator bar and thus the bags may be used from a storage roll.

Accordingly, it is an object of the present invention to provide a bag producing machine and method particularly adapted for high rate heat sealing and perforating of flat tubular plastic material to form plastic bags, and particularly to form such plastic bags directly in line with an extruder which delivers the tubular plastic to the machine of the invention.

Another object of the invention is to provide a novel bag producing machine having a carriage which moves backwardly and forwardly toward and away from an extruder, respectively, and which heat seals, perforates and holds plastic tubing while the carriage of the invention moves in connection with the tubing and a rate comparable to that of the plastic tubing moving from the extruder.

Another object of the invention is to provide a novel carriage on which a heat seal bar and a perforator bar operate in conjunction with a platen and wherein a pair of clamp means holds the plastic tubing during heat sealing and after the heat seal bar has been released therefrom and until the plastic is cooled, so that the plastic does not tend to separate under tension at the heat sealed area.

Another object of the invention is to provide a novel moving carriage and platen together with relatively movable heat seal and perforator means and wherein a pair of clamp means straddle the heat seal bar and perforator bar and one of the clamp means is engageable with plastic tubing adjacent to a platen on which heat sealing is accomplished and said last mentioned clamp means is movable toward the heat seal bar to provide for slack condition of the plastic to avoid tension separation thereof during heat sealing and subsequent thereto when the heat seal bar is removed from the plastic and during the time when the clamp means still hold the plastic on the platen and during the time when the platen, together with its supporting carriage, move at a rate comparable to the movement of the tubular plastic from an extruder.

Another object of the invention is to provide a novel means for separating heat sealed and perforated bags one from the other as the machine operates continuously to produce such bags from tubular plastic as it is moved in a constant linear direction from an extruder.

Another object of the invention is to provide a machine and method for producing plastic bags which is very efficient, operates at a high rate of speed, and produces strong heat sealed bags of plastic tubing such as polyethylene or the like.

Another object of the invention is to provide a bag producing machine having novel control means for moving a carriage backward and forward together with a reversible drive means so that the carriage as well as the heat bar perforator and clamp means may move in unison with plastic tubing extruded from an extruder and which may heat seal, perforate and cool the heat sealed area during movement of the plastic through the machine at a constant rate.

Further objects and advantages of the invention may be apparent from the following specification, appended claims, and accompanying drawings.

DESCRIPTION OF THE PREFERRED EMBODIMENTS

Figure 1:
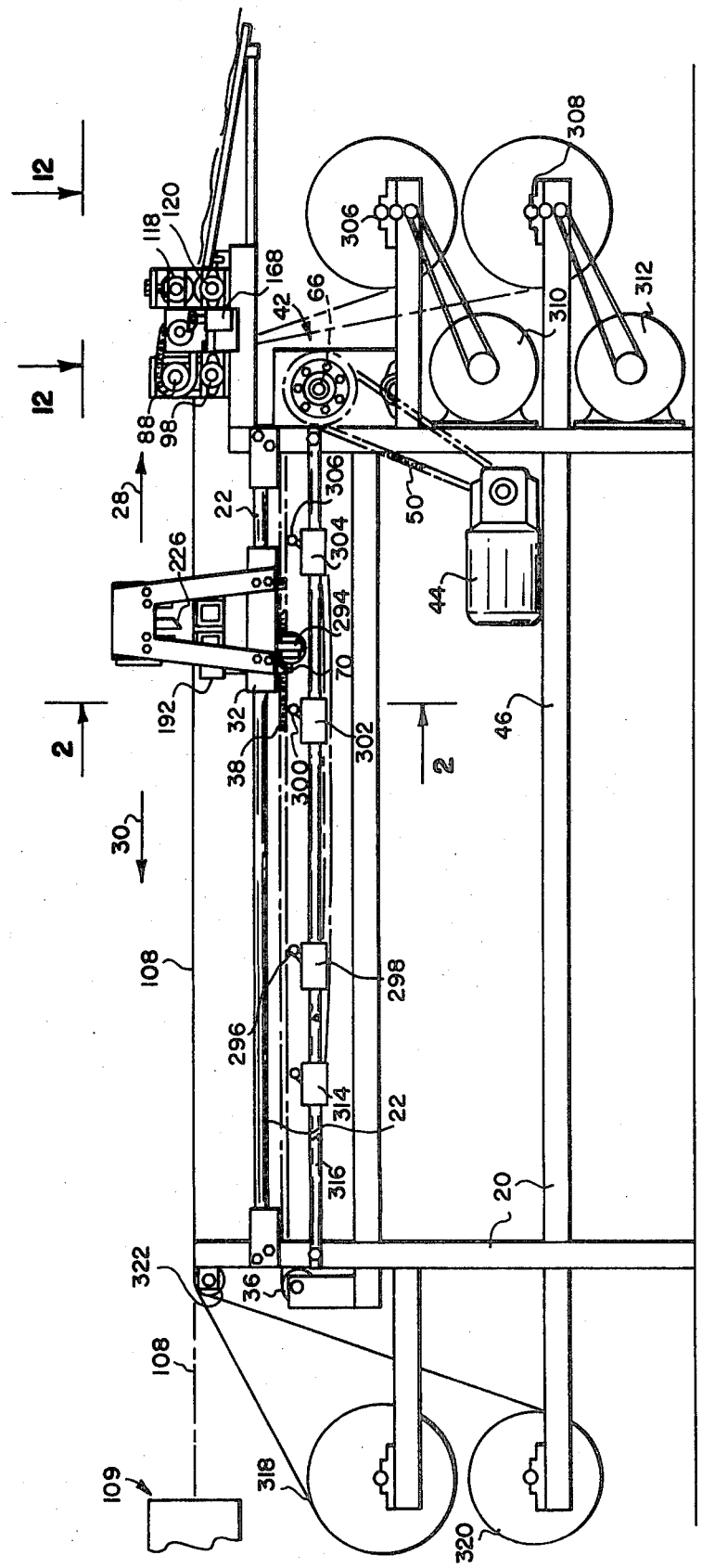
FIG. 1 is a side elevational view of a bag producing machine in accordance with the present invention and showing flat tubular plastic material in relation thereto which is projected directly from an extruder.

As shown in FIG. 1 of the drawings, the bag producing machine of the invention is provided with a frame 20. Mounted on the frame 20 in generally horizontal disposition are slide bars 22 and 24 which are shown in FIGS. 1, 2, 4 and 5 of the drawings. Slidably mounted on the slide bars 22 and 24 is a carriage 26. This carriage is slidably movable on the bars 22 and 24 in the directions of arrows 28 and 30 which represent forward and rearward directions, respectively, as will be hereinafter described.

The carriage 26 is provided with slide bearings 32 and 34, which are shown in FIGS. 1, 2, 4 and 5 of the drawings. These slide bearings 32 and 34 slide on the slide bars 22 and 24, respectively, as will be hereinafter described in detail.

Figure 9:
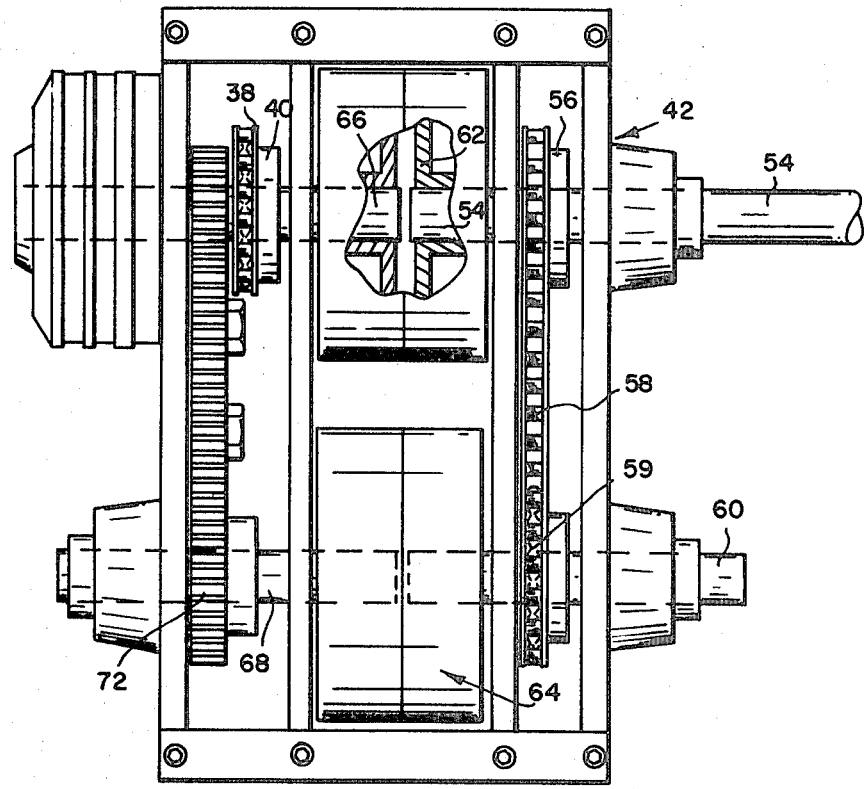
FIG. 9 is an enlarged fragmentary elevational view of the reversible drive mechanism of the invention taken from the line 9—9 of FIG. 1.
Figure 12:
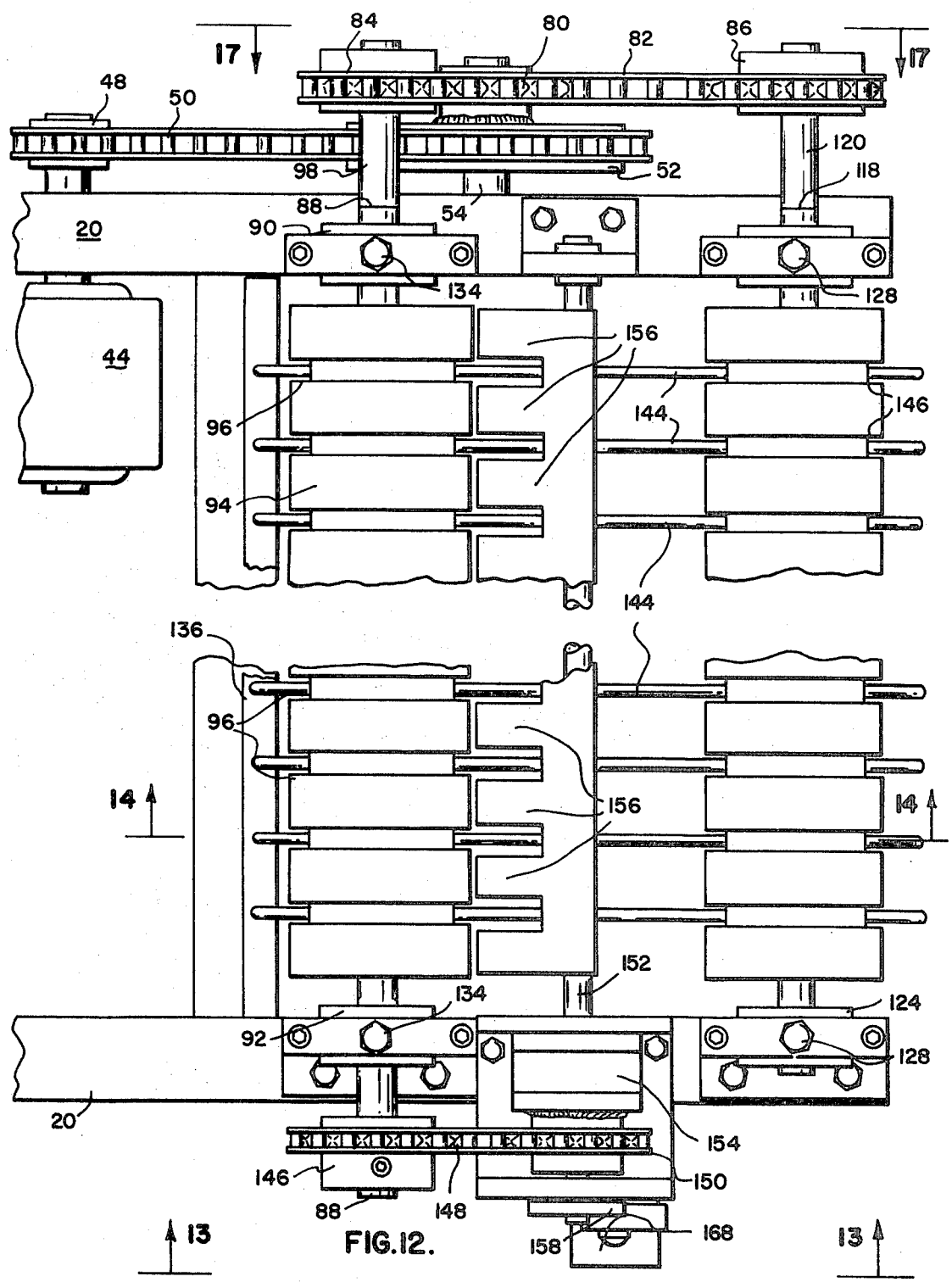
FIG. 12 is an enlarged fragmentary plan sectional view taken from the line 12—12 of FIG. 1.

Mounted rotatably on the frame 20 is a sprocket 36, as shown best in FIG. 1 of the drawings, and a chain 38 is engaged over the sprocket 36 and this chain is also engaged over a sprocket 40 on the reversible drive mechanism 42, shown in FIG. 9 of the drawings. As shown in FIG. 1 of the drawings, a motor 44 is mounted on a horizontal member 46 of the frame 20 and this motor, as shown in FIG. 12, is provided with an output shaft carrying a sprocket 48 engaged by a chain 50. This chain 50 drives a sprocket 52 mounted on a shaft 54, which constantly drives a sprocket 56 engaged by a chain 58 which passes over another sprocket 59 on a shaft 60, all as shown best in FIG. 9 of the drawings.

Figure 3:
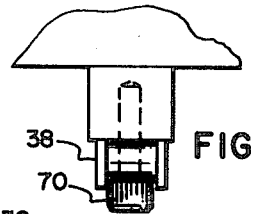
FIG. 3 is an enlarged fragmentary view showing means for connecting a drive chain with the carriage of the invention.

Coupled to the shafts 54 and 60 are solenoid clutches 62 and 64 which are adapted to couple the shafts 54 and 60, respectively to shafts 66 and 68, respectively. The solenoid clutches 62 and 64 are, however, alternately operated so that only one of the shafts 66 or 68 may be driven in order to drive the sprocket 40. As hereinbefore described, the chain 38 passes over the sprocket 40 and the sprocket 36, and the chain 38 is fixed to the frame of the carriage 26 by means of a bolt 70, shown best in FIGS. 1 and 3 of the drawings. The chain 38, coupled to the carriage 26 by the bolt 70, may be driven in a forward direction according to the arrow 28, when the solenoid clutch 62 is engaged for directly driving the shaft 66 by means of the shaft 64. At this time, of course, the clutch 64 is disengaged so that the shaft 60 may not drive the shaft 68.

Figures 10, 11:
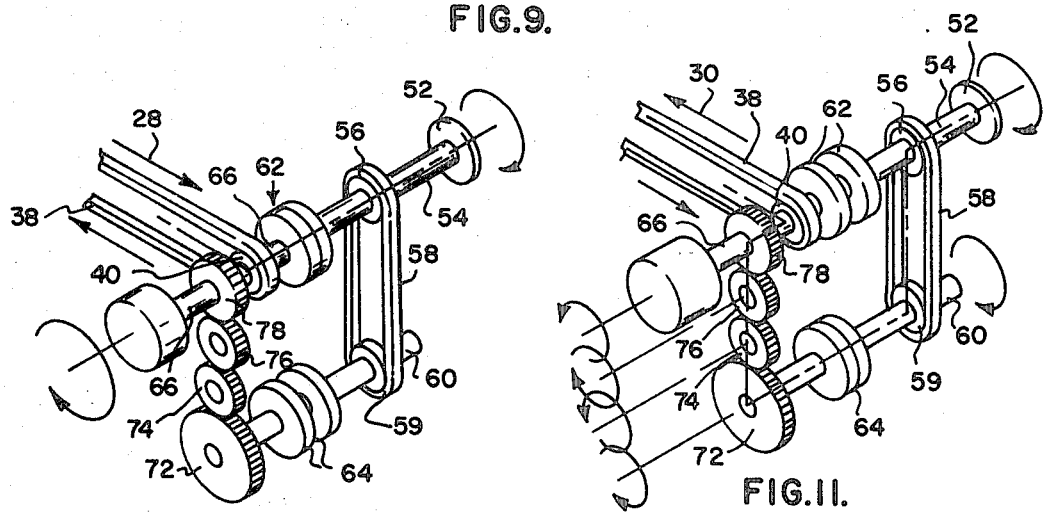
FIG. 10 is a diagrammatic view of the reversible drive mechanism showing one drive position for driving the carriage of the invention in a forward direction.
FIG. 11 is another diagrammatic view similar to FIG. 10, showing the drive mechanism in a speed increasing drive position for driving the carriage of the invention in a reverse direction.

When the clutch 62 is de-energized and the clutch 64 is energized, the shaft 54 drives the sprocket 56, chain 58, sprocket 59, and shaft 60, which is then coupled to the shaft 68 by the clutch 64. The shaft 68 operates a large spur gear 72 which meshes with a smaller spur gear 74, and the smaller spur gear 74 meshes with a like gear 76 in mesh with a gear 78 fixed on the shaft 66. As shown in FIG. 10, the clutch 62 is engaged for direct drive through the clutch 62, and as shown in FIG. 11, the clutch 64 is engaged for direct drive through the speed increasing gear train provided by the gears 72, 74, 76 and 78. It will be noted that arrows about the axes of the gears 72, 74, 76 and 78, as indicated in FIG. 11, show that rotation of the shaft 66 is the reverse of that when the clutch 62 is operated and the shaft 66 is in direct drive, as shown in FIG. 10 of the drawings. Thus, when the clutch 62 is energized and the clutch 64 is de-energized, the carriage 26, by means of the chain 38, is moved in a forward direction as indicated by the arrow 28 in FIG. 1 of the drawings, and when the clutch 64, as shown in FIG. 11 of the drawings, is energized and the clutch 62 is de-energized, the speed increasing gear train operates the chain 38 in the reverse direction, as indicated by arrows 30 in FIGS. 1 and 11 of the drawings, and in addition to moving the carriage 26 in the rearward or backward direction 30, the speed increasing gear train, operating as shown in FIG. 11, moves the carriage in the backward direction 30 at a greater rate of speed than in the forward direction 28, in order to increase the cycle rate of the machine of the invention, as will be hereinafter described in detail.

As shown in FIG. 12 of the drawings, the shaft 54 carries a sprocket 80 adjacent to the sprocket 52, hereinbefore described, and this sprocket 80 engages a chain 82 which also is engaged over sprockets 84 and 86. The sprocket 84 is mounted on a shaft 88 journalled in bearings 90 and 92 which are supported on the frame 20. Carried by the shaft 88 is a roller, preferably made of rubber-like material, this roller being designated 94 and being provided with longitudinally spaced apart annular grooves 96 in the periphery thereof.

Figure 13:
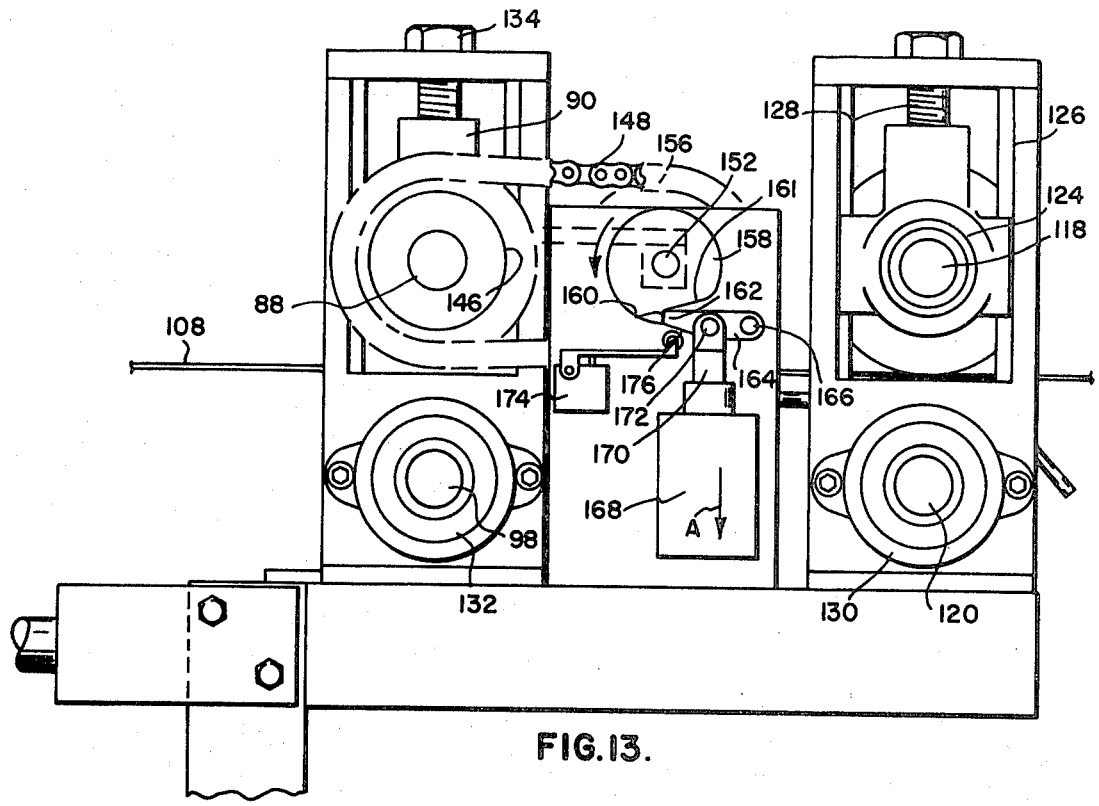
FIG. 13 is a fragmentary elevational view taken from the line 13—13 of FIG. 12.
Figure 15:
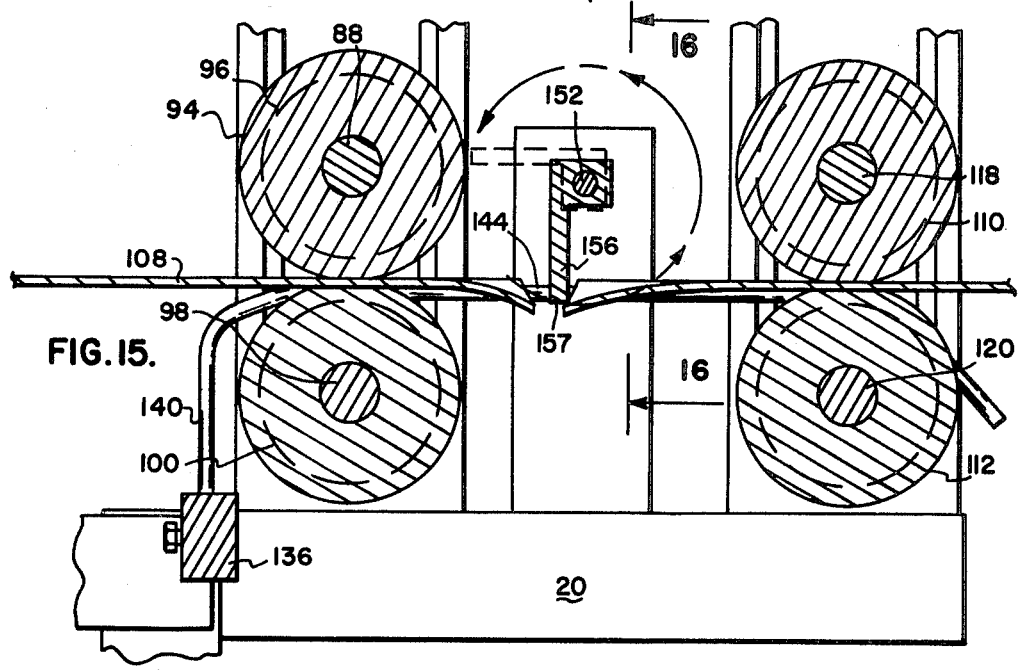
FIG. 15 is a view similar to FIG. 14 but showing a rotary operating position of the separator bar of the invention when separating perforated plastic bags.
Figure 16:
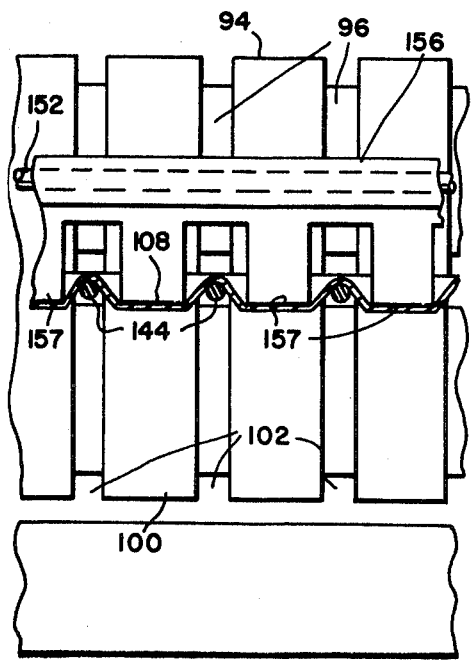
FIG. 16 is a fragmentary sectional view taken from the line 16—16 of FIG. 15, showing disposition of the plastic bag material during the separating operation disclosed in FIG. 15.
Figure 17:
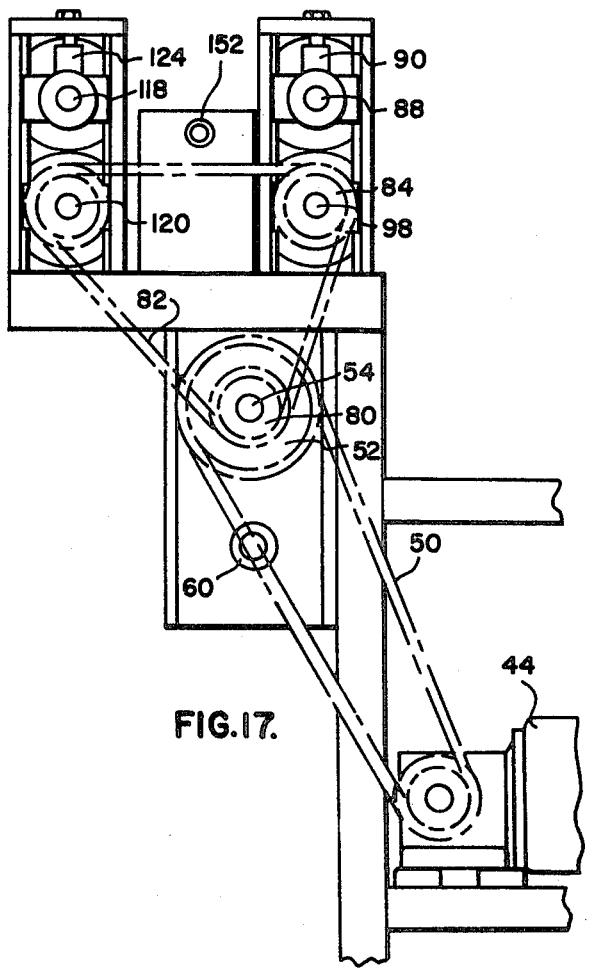
FIG. 17 is a perspective view taken from the line 17—17 of FIG. 12.

As shown in FIGS. 13 and 15, the shaft 88 is superimposed above a shaft 98 carrying a roller 100 which is similar to the roller 94 and which is provided with annular grooves 102 in alignment with the annular grooves 96 of the roller 94.

Figure 14:
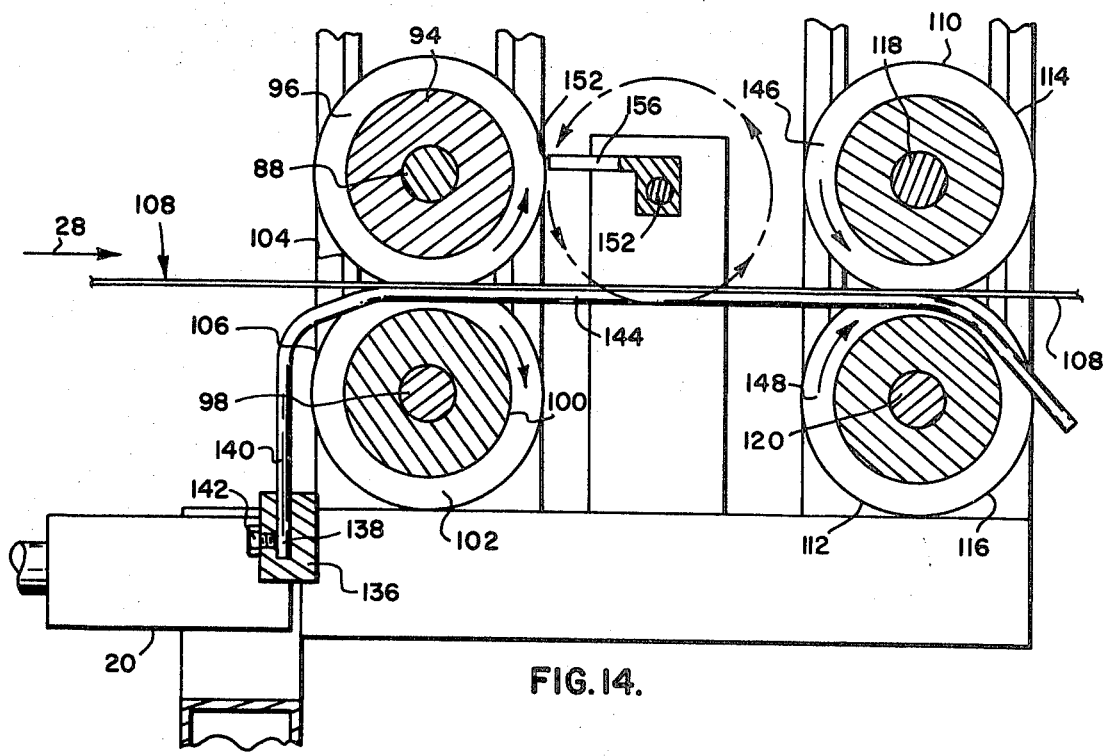
FIG. 14 is a fragmentary sectional view taken from the line 14—14 of FIG. 12.

The rollers 94 and 100 constitute a pair of drive rollers having peripheries 104 and 106 between which flat tubular plastic 108 may be driven in the forward direction indicated by an arrow 28 in FIG. 14 of the drawings.

Accordingly, the rollers 94 and 100 constitute a first pair of rollers and a second pair of rollers 110 and 112 are similar to the rollers 94 and 100. These rollers 110 and 112 are provided with peripheries 114 and 116 between which the flat tubular plastic 108 is engageably driven.

The rollers 110 and 112 are mounted respectively on shafts 118 and 120 and the shaft 120 carries the hereinbefore described sprocket 86 as shown in FIG. 12 of the drawings.

The shaft 118 is similar to the shaft 88 and is mounted in bearings 122 and 124 as shown best in FIG. 12 of the drawings.

With reference to FIG. 13 of the drawings, it will be seen that the bearing 124 is vertically mounted in a slide frame 126 and is adjustable upwardly and downwardly by means of an adjusting screw 128 so that the periphery 114 of the roller 112 may be moved downwardly by means of adjusting the bearings and the shaft 118 in order that the periphery 114 may be maintained in driving relation with the flat plastic tubing against the periphery 116 of the roller 112. The shaft 120, as shown in FIG. 13, is mounted in stationary bearings 130 below the respective bearings 122 and 124 while both these bearings 122 and 124 are vertically adjustable by means of a respective adjusting screw 128, as shown best in FIG. 13 of the drawings.

It will be seen that the shaft 88 is likewise supported in vertically adjustable bearings 90 and 92, as hereinbefore described, and that the shaft 98 is stationarily rotatably mounted in bearings 132 which are held stationary and thus the bearings 90 and 92 may be vertically adjustably operated by means of adjusting screws 134 in order to adjust the periphery 104 of the roller 94 relative to the periphery 106 of the roller 102 for gripping the flat plastic tubing 108 so as to drive the plastic tubing 108 in the forward direction as indicated by the arrow 28 in FIG. 14 of the drawings.

Coupled to the frame 20 is a guide bar support 136, having recesses 138 wherein ends of guide bars 140 are held by set screws 142. These guide bars, as shown in FIG. 14, extend upwardly and generally on an incline to a horizontal intermediate portion 144 thereof, and this intermediate portion 144 of each of the guide bars extends through peripheral grooves 96 and 102 of the rollers 94 and 100, and the portion 144 of each guide bar 140 extends through corresponding annular grooves 146 and 148 of the rollers 110 and 112, respectively.

It will be seen, as shown in FIG. 12, that the intermediate portions 144 of the guide bars 140 span the distance between the pairs of rollers constituted by the rollers 94 and 100 and the rollers 110 and 112.

As shown in FIGS. 1 and 12 of the drawings, a sprocket 146 engages a chain 148 which passes over a sprocket 150 rotatably mounted around a separator shaft 152. A magnetic clutch 154 is disposed intermittently to be energized for drivably coupling the sprocket 150 to the shaft 152.

The separator shaft 152 is provided with a plurality of separator fingers 156 coupled thereto, and these separator fingers 156, as shown in FIGS. 14 and 15, are adapted to engage flat plastic tubing 108 at areas between the guide bar portions 144 so as to separate previously perforated portions of the tubing, as will be hereinafter described.

Affixed to the shaft 152 is a precipice cam 158 having a precipice portion 160 engageable by an end 162 of a stop dog 164 which is pivoted stationarily on a pin 166.

A solenoid 168 is provided with a spring loaded plunger 170 adapted to normally force the end 162 of the dog 164 into the position as shown in FIG. 13 for engaging the precipice 160.

The plunger 170 is coupled to the dog 164 by a pivot pin 172 and a switch 174 is provided with a contact arm 176 engageable with the dog 166, and this switch 174 is normally open when the dog 164 is in the position shown in FIG. 13 of the drawings. However, as the solenoid 168 pulls the dog in the direction of an arrow in FIG. 13, the dog closes the switch 174 which energizes the solenoid 154 as the dog portion 162 clears the precipice 160, thereby causing revolution of the shaft 152 and fingers 156, as shown in FIGS. 14 and 15, to cause the ends 157 of the fingers to pass between the guide bar portions 144, as hereinbefore described.

The solenoid 168 is energized by momentary contact switch and the spring loaded armature immediately returns causing the dog 164 to pass back into the position shown in FIG. 13 and to de-energize the clutch 154 just previous to the approach of the precipice 160 to the end portion 160 of the dog 164. This is accomplished by movement of the dog 164 toward the incline 161 of the cam precipice and to thus open the switch 174 as the precipice 160 approaches the end 162 of the dog 164, all as will be hereinafter described in the general mode of operation of the machine of the invention.

It will be understood that the pairs of rollers 94 and 100, and 110 and 112, respectively, drive the flat tubular plastic 108 in a forward direction as indicated by the arrow 28 and that these rollers may drive such plastic tubing at a rate comparable to the rate at which an extruder delivers the plastic 108. With reference to FIG. 1 it will be seen that an extruder 109 may be disposed in line with the machine of the invention for delivering the tubular plastic to the machine of the invention.

The operation of the separator shaft 152 and the fingers 156 connected therewith, serves to separate perforated bags from a continuous length of flat tubular plastic tubing which has been heat sealed and perforated at spaced intervals or positions, all as will be hereinafter described in detail.

The flat plastic tubing is heat sealed and perforated by means in connection with the traveling carriage 26 which travels backwardly as indicated by the arrow 30 toward the extruder 109, and grips the plastic and heat seals it and perforates it while the carriage is traveling in a forward direction as indicated by the arrow 28. The carriage 26 performs the function of carrying the heat seal bar, the perforator bar and the suitable clamp means for holding the plastic material while it is being heat sealed and for a short time after the heat seal bar has been removed therefrom so that tension provided by the pairs of drive rollers hereinbefore described does not cause the plastic to separate at the heat sealed portion. Accordingly, the carriage provides for heat sealing, perforating, and cooling the heat sealed portion while resisting tension of the plastic as the carriage travels at the same rate that the flat tubular plastic moves in the forward direction as driven by the drive rollers hereinbefore described in connection with FIGS. 14 and 15.

As shown in FIGS. 1 to 8, inclusive, of the drawings, the carriage 26 is provided with a base frame portion 180 coupled to the slide bearings 32 and 34, which are slidably mounted on the slide bars 22 and 24. The base frame portion 180 is substantially horizontal, and coupled thereto are upstanding frame portions 182 and 184 which carry a superimposed horizontal frame member 186.

Vertically slidably mounted in the base frame portion 180 are a pair of vertically slidable bars 188 and 190 which support a platen 192 which is provided with a platen layer 194 on the upper surface thereof. This platen layer 194 is preferably made of silicone rubber or any other suitable material on which plastic material such as polyethylene or the like may be heat sealed.

Accordingly, the platen 192 is vertically movable upward and downward by means of the vertically slidable bars 188 and 190 and power operated elevator mechanism, as will be hereinafter described in detail.

The platen layer 194 is provided with a slot 198 therein, through which teeth 200 of a perforator bar 202 may pass, as will be hereinafter described.

The platen layer 194 is also provided with a laterally movable portion 204 carried on a pivoted member 206 which is pivotally mounted by means of a pin 208 carried by the platen structure 192.

The pivoted member 206 is provided with an opening 210 movably mounted over the shank 212 of a bolt which is provided with a screw threaded portion 214, screw threaded in the sidewall of the platen 192. A compression spring 216 tends to force the platen portion 204, and the movable member 206 which supports it, away from the remaining portion of the platen layer 194, all as will be hereinafter described in detail.

Figure 6:
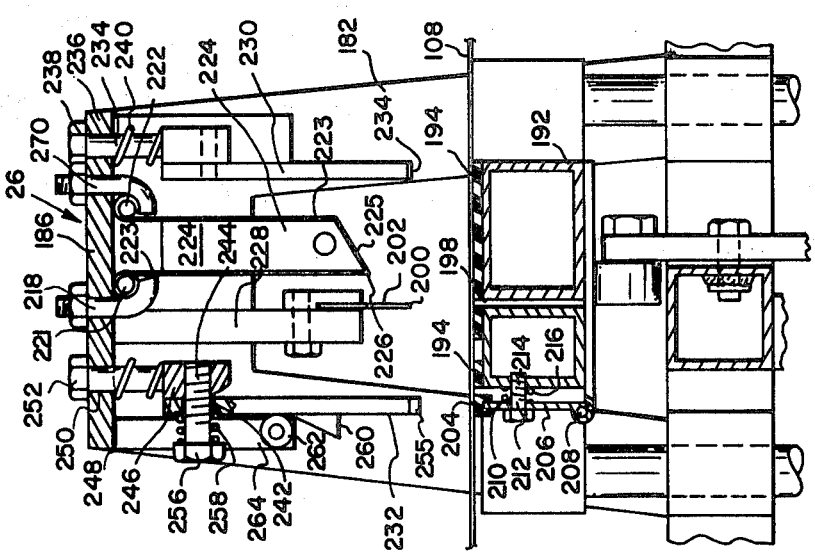
FIG. 6 is an enlarged transverse sectional view of the carriage structure of the invention taken from the line 6—6 of FIG. 2.

The superimposed frame portion 186 of the carriage 26 is provided with suspension members 218 and 220, in the form of hook-shaped bolts which are clamped about bars 221 and 222. Around these bars is wrapped a sheet of Teflon, designated 223. This sheet 223 may be made of other wuitable material, if desired, and is formed into a generally U-shaped envelope, as shown in FIG. 6, wherein a metallic heat seal bar 224 is suspendingly supported. It will be understood that the envelope 223 is flexible and that a lower angular edge 225 of the heat seal bar 224 forms a sealing edge over which a respective portion 226 of the envelope 223 is disposed so as to prevent the heat seal bar from sticking to the polyethylene or other plastic, generally designated 108, and which normally is disposed contiguous with the platen layer 194, as shown best in FIG. 6 of the drawings.

Carried by the superimposed frame portion 186 is a perforator bar support 228 and this support 228 carries the perforator bar 202 having substantially saw-tooth shaped teeth 200 at its lower edge which are adapted to be projected through the hereinbefore described slot 198 as the platen 192 moves upwardly, as will be hereinafter described.

Also carried by the horizontal superimposed frame member 186 is a pair of clamp means which straddle the area occupied by the heat seal bar 224 and the perforator bar 202.

One of the pair of clamp means is designated 230 and the other of the pair of clamp means is designated 232. The clamp means 230 is provided with a plastic film engaging edge portion 234 adapted to clamp against the plastic film 108 in opposition to the platen layer 194, and this clamp means 230 is provided with a shake 234 reciprocally mounted in an opening 236 of the superimposed frame member 186 of the carriage 26. The shake 234 is provided with a head 238 adapted to abidingly engage the upper side of the frame member 186, and a compression spring 240 tends to project the clamp means 230 downwardly toward the platen layer 194.

The clamp means 232 is provided with an opening 242 surrounding a bolt 244 carried by a chain structure 246 having a portion 248 reciprocally mounted in an opening 250 of the superimposed frame member 186 and the upper end of the portion 248 is provided with a head 252 abuttingly engageable with the upper side of the superimposed frame 186.

A compression spring 254 tends to force the chain structure 246 downwardly toward the platen layer 194 and is adapted to cause a lower engaging edge 255 of the clamp means 232 to engage plastic film 108 on the platen 194 when the platen 192 is moved upwardly, as will be hereinafter described.

The clamp means 232 at its opening 242 is pivotally mounted on the bolt 244 and this bolt 244 is provided with a head 256 engaging a compression spring 258, which tends to hold the clamp means 232 in generally vertically disposed position, but in pivotal relation to the shank 246.

A cam portion 260 carried by the clamp means 232 is engageable with a roller 262, fixedly rotatably supported on a leg 264, fixed to the frame member 186 and directed downwardly therefrom.

When the platen 192 is moved upwardly, plastic film 108 is engaged between the edge 255 of the clamp means 232 and the portion 204 of the platen layer 194, as hereinbefore described.

With continued upward movement of the platen 192, as will be hereinafter described, the clamp means 232, after being engaged by the plastic film 108 on the platen layer 194, is moved upward against compression of the spring 254 and the cam 260 operating against the stationary roller 262 causes the edge 255 of the clamp means 232 to move toward the perforator bar 202 and the heat seal bar 224.

Concurrently, the dge 234 of the clamp means 230 is also engaged with the plastic 108 in opposition to the layer 194 of the platen 192.

As the cam 260 is moved laterally relative to the roller 262, the edge 255 of the clamp means causes the member 206 and the platen portion 204 carried thereby to move toward the perforator bar 200 and to thereby clampingly move the plastic 108 toward the heat seal bar and to create a slack condition therein between the clamp means 230 and 232 in the area of the heat seal bar 224. Accordingly, when the platen reaches an elevation at which the plastic 108 is engaged by the edge 226 of the heat seal bar 224 with the porton 226 of the envelope 223 therearound, the plastic is held in a slack condition between the clamp means 230 and 232 and thus tension caused by the drive rollers 94 and 100, and the drive rollers 110 and 112, does not cause separation of the plastic in the area of the edge 226 of the envelope surrounding the edge 225 of the heat seal bar 224.

Figure 2:
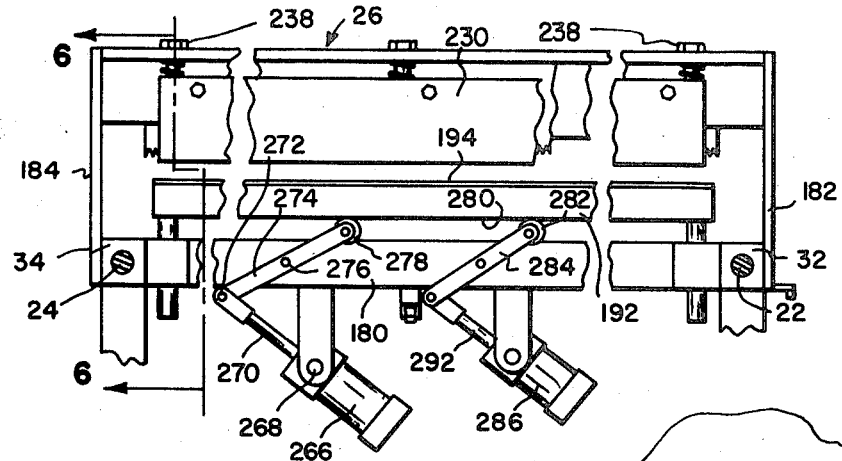
FIG. 2 is an enlarged fragmentary transverse sectional view taken from the line 2—2 of FIG. 1.
Figure 4:
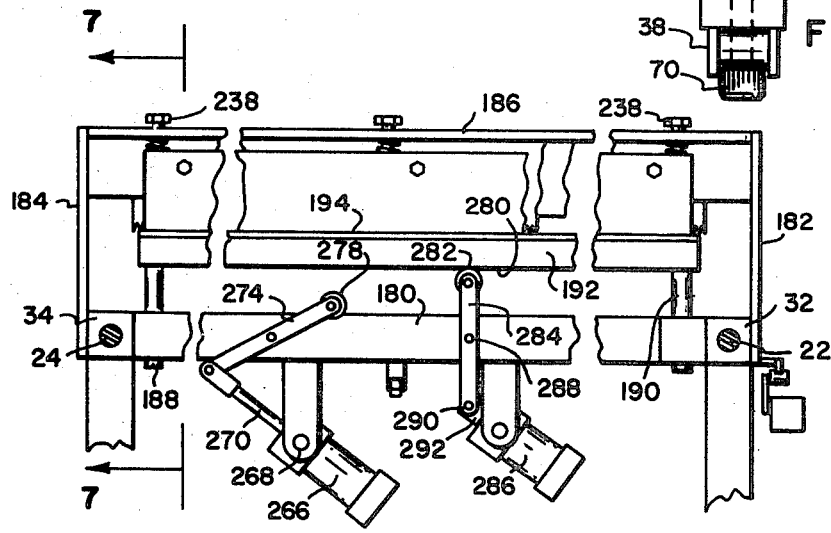
FIG. 4 is an enlarged fragmentary transverse sectional view similar to FIG. 2, showing a varying position of the mechanism as disclosed in FIG. 2.
Figure 5:
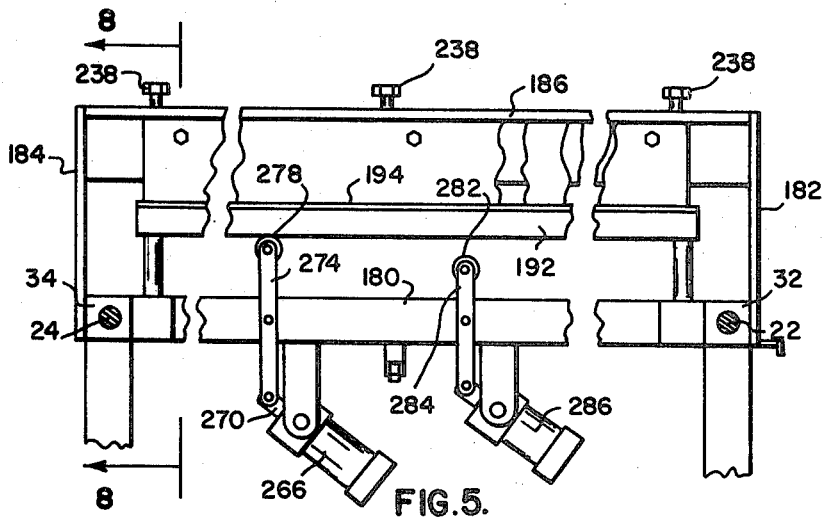
FIG. 5 is another view similar to FIGS. 2 and 4 but showing another different position of the mechanism of the invention.
Figure 8:
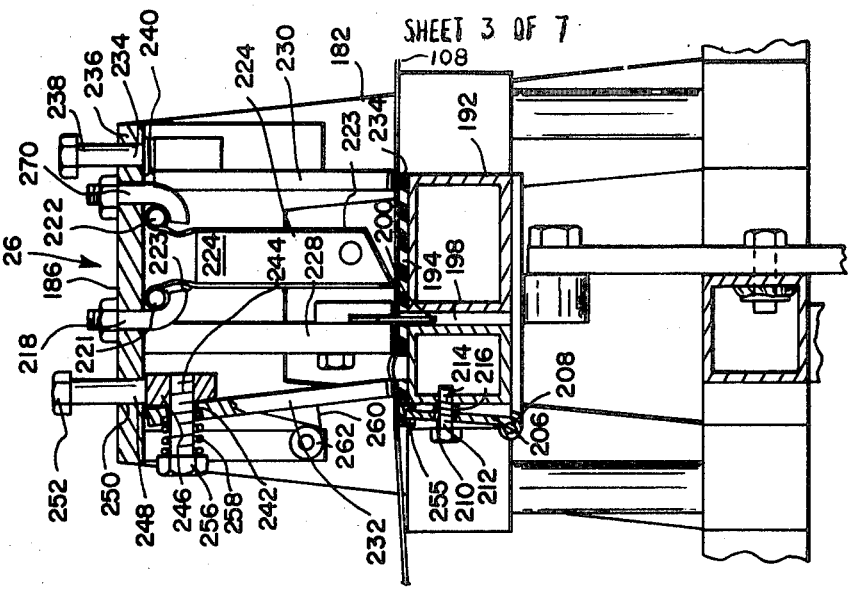
FIG. 8 is a view similar to FIGS. 6 and 7, taken from the line 8—8 of FIG. 5.
Figure 7:
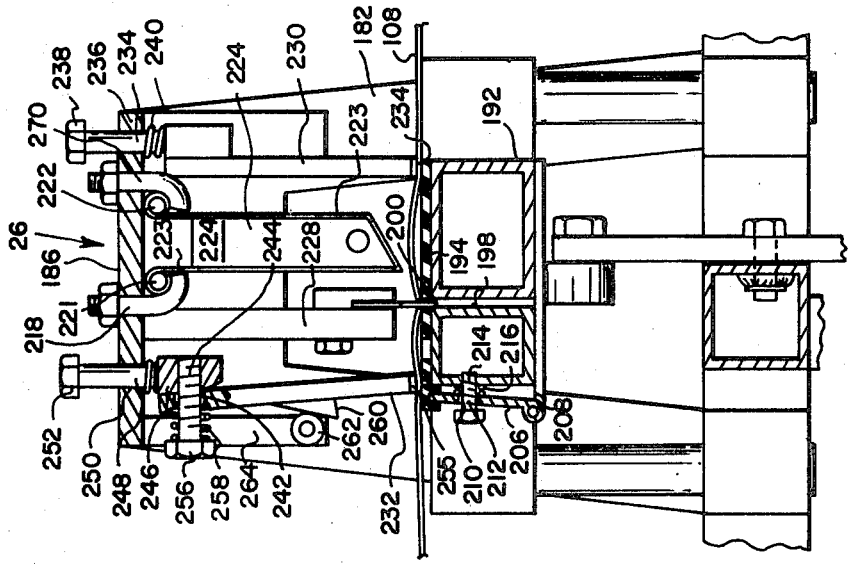
FIG. 7 is a view similar to FIG. 6, taken from the line 7—7 of FIG. 4.

As shown in FIGS. 2, 4 and 5 of the drawings, elevating means is provided for elevating the platen 192, and this elevating means coprises a fluid operated cylinder 266 pivoted by means of a pin 268 on the frame portion 180 of the carriage 26. A plunger 270 of the cylinder 266 is pivoted by meas of a pin 272 to a lever 274 which is pivoted by means of a pin 276 on the frame member 180, and a roller 278 is carried by the end of the lever 274 and is adapted to bear upwardly against a lower surface 280 of the platen 192. When the lever 274 is pivoted upwardly by the cylinder 266, the platen 192 is elevated to the full position as shown in FIG. 5 of the drawings, which corresponds with the disposition thereof, as shown in FIG. 8 of the drawings, wherein the platen 192 is rased to its maximum position, and wherein the clamp means 230 and 232 are fully engaged with the plastic 108 and clampingly holding the plastic against the platen layer 194, and wherein the clamp means 232 is pivoted by the cam 262 into a position to create a slack condition of the plastic 108, as hereinbefore described. In this position, the portion 226 of the envelope 223 at the edge 225 of the heat seal bar 224 contacts and heat seals the plastic material 108, which is a tubular material, and then the cylinder 266 may be de-energized to allow the lower surface 280 of the platen 192 to be supported on a roller 282, carried by lever 284, actuated in connection with a fluid operated cylinder 286, it being noted, however, that the lever 284 is shorter than the lever 274 and allows the platen 192 to be supported at a level substantially as shown in FIG. 7 of the drawings, wherein the heat seal bar is disengaged from the plastic 108 so that the heat seal previously made may cool before the clamp means 230 and 232 are disengaged from the plastic and the platen layer 194. In this position, as shown in FIG. 7, it will be ovserved that the springs 240 and 254 around the shakes 234 and 248 are still somewhat compressed, holding the lower edges 234 and 255 of the clamp means 230 and 232 against the plastic 108 and platen 194. Thus the plastic is held in flat condition around the heat sealed area until it is cooled.

It will be seen that the lever 284 is pivoted on a pin 288, carried by the frame 180, and pivoted by means of a pin 290, the lever is connected to a plunger 292 of the cylinder 286.

The cylinder 286, as well as the cylinder 266, when de-energized, allows the platen 192 to drop to the position shown in FIGS. 2 and 6, wherein the platen is in its lowermost position and wherein the clamp means 230 and 232 are disengaged from the plastic 108 and the perforator bar 200 is retracted from the slot 198 so that the plastic 108 is free to move relative to the carriage 26.

It will be seen that the FIGS. 2, 4 and 5 correspond to FIGS. 6, 7 and 8 in disclosing the relative positions of the clamping means and the platen 192, as well as the relative positions of the perforator bar and heat seal bar, 202 and 224, respectively.

It will be understood that the flexible envelope 223 allows some vertical movement of the heat seal bar 224 relative to the frame member 186 when the platen 192 is moved upwardly so as to cause the platen layer 194 and the plastic being heat sealed thereon to move against the portion 226 of the envelope 223 which is dipposed over the heat sealing edge 225 of the heat seal bar 224.

The loops of the envelope around the supporting bars 221 and 222, as shown in FIG. 6 of the drawings, thus suspend the heat seal bar 224 in slightly vertically movable position so that engagement tolerance of the platen 194 relative thereto may be non-critical and whereby effective engagement of the heat seal bar may always be attained with the plastic 108 when the platen 192 is moved to an upward position by means of the cylinder 266 and the lever 274.

When the platen 192 is in the position as shown in FIG. 6 of the drawings, the carriage 26 is free to move relative to the flat plastic tubing 108, and in this position the carriage may be moved backwardly as shown in FIG. 1 of the drawings, in the direction of the arrow, by the reversible drive mechanism 42, as hereinbefore described, until a trip bar 294 on the carriage 26 engages an arm 296 of a limit switch 298. At this time the switch 298, in circuit with the magnetic clutch 62, energizes the magnetic clutch 62 and de-energizes the magnetic clutch 64 so that the carriage 26 may be moved in the forward direction of the arrow 28. Concurrently with the operation of the switch 296, the cylinde 266 is energized, causing the platen 192 to assume the position shown in FIG. 8, wherein the heat seal bar heat seals the tubular plastic 108 and the perforator bar extends through the slot 198 such that its teeth 200 provide perforations in the plastic 108 adjacent the heat seal made by the heat seal bar 226.

As the carriage 26 is moved in the direction of the arrow 28, the contact bar 294 engages a contact arm 300 of a switch 302 which de-energizes the cylinder 266 and energizes the cylinder 286, to allow the carriage 192 to drop down onto the roller 282 and to disengage the heat seal bar from the plastic tubing 108, as indicated by the diclosure in FIG. 7. In this position, however, the clamp means 230 and 232 are still engaged with the plastic on the platen layer 194 to prevent tension from separating the heat seal while the crrriage 26 is continually moving on toward a switch 304 having a contact arm 306. When the trip bar 294 on the carriage 26 engages the arm 306 of the switch 304, the cylinder 286 is de-energized and the platen 192 is allowed to drop down to the position shown in FIG. 6 of the drawings, as hereinbefore described, and at this time the heat seal in the plastic has cooled sufficiently to allow the drive roller to exert tension thereon.

As the platen 192 is moved to the relsease position as shown in FIG. 6 of the drawings, the switch 304 also de-energizes the clutch 62 and energizes the clutch 64, as hereinbefore described, so that the carriage 26 is automatically reversed in direction and moved rapidly in the direction of the arrow 30, as shown in FIG. 1 of the drawings.

It will be appreciated that due to the fact that the speed increasing gear train, composed of the gears 72, 74, 76 and 78, moves the carriage rapidly in the direction of the arrow 30, that cycle time is saved so that a high linear rate of the plastic 108 may be compatible with the operation of an extruder 109 and thus the drive rollers disclosed in FIGS. 13 and 14 are operated at a compatible rate to move the plastic tubing in the direction of the arrow 28.

The back and forth cycling of the carriage 26, as hereinbefore described, is continuous and automatic and the plastic tubing may be rolled on take-up and storage rollers 306 and 308, which are slidably driven in the conventional manner by respective motors 310 and 312, downstream from the drive rolles 94 and 100, hereinbefore described.

Under such conditions, the bar 136 and the guide bars 140 may be removed to thereby allow direct roll storage of the heat sealed and perforated plastic tubing on the storage rolls 306 and 308. At this time, a switch similar to the switch 298 is moved out of interference, with relation to the carriage 26, so that the solenoid 168 will not be energized. If desired, the bags may be separated at their perforations by energizing the solenoid, as hereinbefore described, to cause operation of the separator bar and its fingers 156, to perform the separating function hereinbefore described in connetion with FIG. 15 of the drawings, wherein the ends 157 of the fingers 156 separate each perforated portion previously made by the perforator bar 202, and during each cycle of operation of the carriage 26 in tmed relation with the operation of the perforator bar, and in this manner separate bags may be delivered from the machine of the invention, as hereinbefore described.

The switch coupled to the solenoid 168 is designated 314 in FIG. 1 of the drawings, and is placed on a bar separate from the switches 298, 302 and 304, which are slantably adjustably mounted on a bar 316 so that variable spacing of the respective switches may be attained to produce bags of different lengths and for the purpose of timing the cooling of the heat sealed portion of the bags as the carriage 2 moves along, as hereinbefore described.

If desired, plastic tubing may be fed to the machine of the invention from rollers 318 or 320, and over a roller 322, when the machine of the invention is not operating directly downstream from an extruder such as the extruder diagrammatically disclosed and designated 109 in FIG. 1 of the drawings.

It will be obvious to those skilled in the art that various modifications of the present invention may be resorted to without departing from the spirit thereof.

We claim:

1. In a bag producing machine, the combination of: a frame; a carriage movable in forward and backward directions on said frame; reversible drive means disposed on said frame and coupled to said carriage for moving said carriage in said forward and backward directions on said frame; first means for continuously moving flat tubular plastic in said forward direction relative to said frame; a platen on said carriage, adjacent to which said tubular plastic may slide in said forward direction; an elongated heat seal bar on said carriage; an elongated perforator bar disposed generally parallel with and in close proximity to said heat seal bar, said perforator bar being supported on said carriage; said platen having a slot therein through which said perforator bar may pass as it perforates said flat tubular plastic; said heat seal bar and said perforator bar disposed at an angle to said forward and rearward directions; a pair of clamp means coupled to said carriage and disposed to straddle an area wherein said heat seal bar and said perforator bar are disposed; said pair of clamp means and said platen being respectively movable toward and away from each other; said clamp means being disposd to grip said flat tubular plastic securely relative to said carriage and said platen; second means for moving at least one of said clamp means, when moving said tubular plastic on said platen, in a direction toward said heat seal bar to relieve tension in said tubular plastic in the area of said heat seal bar; said heat seal bar and said platen being relatively movable toward and away from each other; third means for sequentially and respectively causing relative movement between said platen and said clamp means, and said perforator bar and said heat seal bar, to thereby cause sequential engagement of said tubing on said platen by said clamp means, said perforator bar and said heat seal bar; said reversible drive means adapted for concurrently moving said carriage in said forward direction at a rate equal to that at which said first means moves said plastic tubing in said forward direction; control means for causing relative actuation of said platen and said pair of clamp means, said heat seal bar, said perforator bar and for actuating said reversible drive means in said forward and rearward directions; said control means comprising a first switch means supported by said frame and operable by movement of said carriage on said frame at a stop position in said rearward direction; said first switch means disposed to energize said reveriible drive means to operate in said forward direction; said first switch means disposed to activate said third means; said control means comprising a second switch on said frame and spaced from said first switch in said forward direction; said second switch disposed to actuate said first means for causing relative movement of said platen and said heat seal bar from each other to disengage said heat seal bar from said plastic tubing; said control means comprising a third switch on said frame and spaced in said forward direction from said second switch; said third switch disposed for actuating said third means for causing relative movement of said clamp means and said platen away from each other and for releasing said pair of clamp means from said plastic tubing and said control means having a fourth switch on said frame spaced from said third switch in said forward direction; said fourth switch disposed to energize said reversible drive means in said backward direction.

2. The invention as defined in claim 1, wherein: said reversible drive means is provided with speed increasing means adapted to move said carriage in said backward direction at a higher rate of speed than in said forward direction.

3. The invention as defined in claim 2, wherein: said reversible drive means comprises a pair of spaced apart sprockets on said frame; a chain on said sprockets; said carriage coupled to said chain; a speed increasing gear train; and a direct drive means both coupled to one of said sprockets; a motor drive; a first magnetic clutch disposed to couple said motor drive to said direct drive means; a second magnetic clutch disposed to couple said motor drive to said speed increasing gear train; said speed increasing gear train also disposed to operate said one of said sprockets and said carriage in said backward direction oppositely from said forward direction, in which said direct drive operates said one of said sprockets and said carriage.

4. The invention as defined in claim 1, wherein: said first means comprises a pair of opposed drive rollers having peripheries between which said flat tubular plastic is compressively engaged; means for driving said drive rollers to pull said flat tubular plastic in said forward direction; said first means being spaced from said carriage in said forward direction.

5. The invention as defined in claim 4, wherein: a power driven storage roller is spaced in said forward direction from said drive roller; said storage roller disposed to wind said flat tubular plastic thereon after it has been heat sealed and perforated at a plurality of spaced apart positions thereon.

6. The invention as defined in claim 1, wherein: at least one of said switches is movable in one of said directions to vary the distance between areas of said flat tubular plastic which are successively contacted by said heat seal bar and said perforator bar, to thereby vary the length of the bags being produced by said machine.

7. In a bag producing machine, the combination of: a frame; a carriage movable in forward and backward directions on said frame; reversible drive means disposed on said frame and coupled to said carriage for moving said carriage in said forward and backward directions on said frame; first means for continuously moving flat tubular plastic in said forward direction relative to said frame; a platen on said carriage, adjacent to which said tubular plastic may slide in said forward direction; an elongated heat seal bar on said carriage; an elongated perforator bar disposed generally parallel with and in close proximity to said heat seal bar, said perforator bar being supported on said carriage; said platen having a slot therein through which said perforator bar may pass as it perforates said flat tubular plastic; said heat seal bar and said perforator bar disposed at an angle to said forward and rearward directions; a pair of clamp means coupled to said carriage and disposed to straddle an area wherein said heat seal bar and said perforator bar are disposed; said pair of clamp means and said platen being respectively movable toward and away from each other; said clamp means being disposed to grip said flat tubular plastic securely relative to said carriage and said platen; said heat seal bar and said platen being relatively movable toward and away from each other; third means for sequentially and respectively causing relative movement between said platen and said clamp means, and said perforator bar and said heat seal bar, to thereby cause sequential engagement of said tubing on said platen by said clamp means, said perforator bar and said heat seal bar; said reversible drive means adapted for concurrently moving said carriage in said forward direction at a rate equal to that at which said first means moves said plastic tubing in said forward direction; control means for causing relative actuation of said platen and said pair of clamp means; said heat seal bar, said perforator bar and for actuating said reversible drive means in said forward and rearward directions; said control means comprising a first switch means supported by said frame and operable by movement of said carriage on said frame at a stop position in said rearward direction; said first switch means disposed to energize said reversible drive means to operate in said forward direction; said first switch means disposed to activate said third means; said control mens comprising a second switch on said frame and spaced from said first switch in said forward direction; said second switch disposed to actuate said first means for causing relative movement of said platen and said heat seal bar from each other to disengage said heat seal bar from said plastic tubing; said control means comprising a third switch on said frame and spaced in said forward direction from said second switch; said third switch disposed for actuating said third means for causing relative movement of said clamp means and said platen away from each other and for releasing said pair of clamp means from said plastic tubing and said control means having a fourth switch on said frame spaced from said third switch in said forward direction; said fourth switch disposed to energize said reversible drive means in said backward direction.

8. The invention as defined in claim 7, wherein: said platen is vertically movably mounted to move up and down on said carriage; said heat seal bar being mounted on said carriage stationarily above said platen; said perforator bar being mounted stationarily on said carriage above said platen; said pair of clamp means being movably mounted on said carriage above said platen and spring loaded downwardly toward said platen and provided with stop means limiting said spring loaded downward movement; a first elevator means adapted to elevate said platen upwardly to cause said relative movement and to fully engage with said pair of clamp means, to project said slider portion of said platen beyond said perforator bar and to engage said heat seal bar with said plastic tubing on said platen; said first switch adapted to activate said first elevator to raise said platen; a second elevator adapted to support said platen at a lower elevation than said first elevator for holding said platen in a position at which said heat seal bar is disengaged from said plastic tubing, and wherein said clamp means are both remaining in engagement with said plastic tubing to hold it relaxed therebetween and to prevent tension from pulling the heat sealed area apart during cooling thereof; said second switch adapted to activate said second elevator and de-energize said first elevator in order to drop said platen downward to the level of said second elevator; said third switch adapted to de-energize said second elevator and completely to release said clamp means from said plastic tubing.

9. The invention as defined in claim 1, wherein: said second means comprises a pivotal mounting for one of said clamp means, said pivotal mounting carried by said carriage; said pair of clamp means spring loaded toward said platen and movable in relation to said carriage when engaged by relative movement of said clamp means and said platen toward each other; and cam means operable by movement of said clamp means for pivotally moving said pivotal mounting and for urging one of said clamp means in said direction toward said heat seal bar; said platen having a movable portion adapted to engage an opposite side of said plastic tubing from said pivotally mounted clamp means to thereby permit said cam means readily to move said clamp means and said movable platen portion together with the said tubular plastic toward said heat seal bar for creating slack therein and for relieving tension on said tubular plastic during the heat sealing operation performed by said heat seal bar.

10. The invention as defined in claim 8, wherein: said pair of clamp means is supported on said carriage and spring loaded in a direction toward said platen; stop means on said carriage for limiting spring loaded travel of said pair of clamp means toward said platen so that siad platen and said pair of clamp means may be separated relative to each other.

11. The invention as defined in claim 7, wherein: said first means comprising two pairs of opposed drive rollers having peripheries between which said flat tubular plastic is compressibly engaged; said pairs being spaced apart; means for driving said drive rollers to pull said flat tubular plastic in said forward direction; said first means being spaced from said carriage in said forward direction; each of said rollers of said pairs having a plurality of peripheral grooves spaced axially along each respective roller, said grooves aligned with each other; guide bars extending generally tanggentially relative to and between said peripheries of both pairs of said drive rollers, said guide bars disposed in said grooves; said guide bars bridging the distance between said pairs of said drive rollers; said guide bars secured to said frame and having opposite ends extending generally at an angle away from portions of said guide bars which extend between said pairs of said drive rollers; a bag separator bar rotatably mounted on an axis disposed adjacent to and transversely relative to said guide bars; said separator bar having radially disposed fingers of a length to pass between said guide bars when said separator bar is rotated about said last mentioned axis; said guide bars disposed to guide said flat tubular plastic between said last mentioned axis and said guide bars; and a single revolution clutch mechanism disposed and adapted intermittently to rotate said separator bar a single revolution to thereby engage said flat tubular plastic adjacent said perforations formed by said perforator bar and to force said tubular plastic against said guide bars and to tearingly separate said flat tubular plastic at said perforations successively into separate bags; and separator control switch means on said frame and momentarily operable by movement of said carriage; said separator control switch means disposed and adapted for energizing said single revolution clutch mechanism in timed relationship with each operating cycle of said carriage and said heat seal bar and said perforator bar.

12. The invention as defined in claim 11, wherein: said single revolution clutch comprising a constantly operable power driven member; an electrically operable clutch adapted intermittently to couple said power driven member with said separator bar; a cam having a precipice portion; said cam coupled to said separator shaft; a stop dog pivoted on said frame and adapted to engage said precipice portion for stopping rotation of said separator shaft in a position for holding said fingers in spaced relation to said guide bars; a solenoid coupled to said stop dog for pivoting it out of interference with said precipice portion; means tending to force said stop dog to engage said precipice portion; and single revolution control switch means coupled to said last mentioned clutch and responsive to movement of said stop dog away from said precipice portion to energize said clutch for rotating said separator bar; said momentarily operable separator control switch disposed to energize said solenoid and to de-energize said solenoid before said precipice portion approaches said stop dog; and said stop dog being disposed to operate said single revoltuion control switch to de-energize said last mentioned clutch before said precipice portion rotates into full engagement with said stop dog.

13. A method for producing bags from flat tubular plastic material in line with an extruder, comprising: constantly moving a flat tubular plastic material from an extruder; engaging a heat seal bar with said constantly moving tubular plastic material, and moving said heat seal bar at the same rate of movement of said flat tubular plastic and concurrently holding said plastic at opposite sides of said heat seal bar to prevent tension separation thereof, and then releasing said heat seal bar from said plastic and continuing to move said heat seal bar and holding means at a constant rate of movement of said tubular plastic and allowing the heat sealed portion to cool; then releasing said tubular plastic from the clamping means and returning said heat seal bar and said clamping means backwardly relative to a forward direction of movement of said tubular plastic and then completing the aforementioned operation of said heat seal bar and said clamping means.

14. The invention as defined in claim 13, wherein: said flat tubular plastic is gripped on a platen between a pair of said clamping means in straddling relation to said heat seal bar and one of said clamping means frictionally grips and moves said plastic toward said heat seal bar to create slack between said pair of clamping means and to relive tension in the area of said heat seal bar to thereby prevent tension separation of said plastic at an are of said heat seal bar until said heat seal bar is removed therefrom and until said plastic has cooled, during which time said heat seal bar and said clamp means are moved at a constant rate of movement with the movement of said flat tubular plastic.

* * * * *